United States Patent
Lu et al.

(10) Patent No.: US 10,187,632 B2
(45) Date of Patent: Jan. 22, 2019

(54) 3D DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Xiaochuan Chen, Beijing (CN); Renwei Guo, Beijing (CN); Ming Yang, Beijing (CN); Wenqing Zhao, Beijing (CN); Changfeng Li, Beijing (CN); Qian Wang, Beijing (CN); Lei Wang, Beijing (CN); Rui Xu, Beijing (CN); Peng Liu, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Bejing (CN)

( * ) Notice: Subject to any disclaimer, the term of this patent is extended or adjusted under 35 U.S.C. 154(b) by 183 days.

(21) Appl. No.: 15/159,277

(22) Filed: May 19, 2016

(65) Prior Publication Data
US 2017/0026637 A1 Jan. 26, 2017

(30) Foreign Application Priority Data
Jul. 21, 2015 (CN) .......................... 2015 1 0431115

(51) Int. Cl.
*H04N 13/31* (2018.01)
*G02B 27/22* (2018.01)
(Continued)

(52) U.S. Cl.
CPC ......... *H04N 13/31* (2018.05); *G02B 27/2214* (2013.01); *G09G 3/003* (2013.01);
(Continued)

(58) Field of Classification Search
CPC .............. G02B 27/2214; G02B 27/225; H04N 13/0422; H04N 13/0409
See application file for complete search history.

(56) References Cited

U.S. PATENT DOCUMENTS 8,614,772 B2 * 12/2013 Lin .................... G02B 27/2214
349/1
9,678,352 B2 * 6/2017 Wu ...................... G02B 27/225
(Continued)

FOREIGN PATENT DOCUMENTS

CN 103838030 A 6/2014
CN 104007555 A 8/2014
(Continued)

OTHER PUBLICATIONS

Office action dated Nov. 15, 2016 for corresponding CN application 201510431115.0.

*Primary Examiner* — David E Harvey
(74) *Attorney, Agent, or Firm* — Nath Goldberg & Meyer; Joshua B. Goldberg

(57) ABSTRACT

Embodiments of the invention disclose a 3D display device and a driving method thereof. The 3D display device includes a display panel and a grating structure, when both eyes are parallel to a first direction, a pixel array of the display panel forms a plurality of first left-eye pixel regions corresponding to the left eye and a plurality of first right-eye pixel regions corresponding to the right eye by the grating structure; when both eyes are parallel to a second direction, the pixel array of the display panel forms a plurality of second left-eye pixel regions corresponding to the left eye and a plurality of second right-eye pixel regions correspond-
(Continued)

ing to the right eye by the grating structure, the first left-eye pixel regions are the same as the second left-eye pixel regions, and the first right-eye pixel regions are the same as the second right-eye pixel regions.

20 Claims, 6 Drawing Sheets

(51) Int. Cl.
    *G09G 3/20*     (2006.01)
    *H04N 13/324*     (2018.01)
    *G09G 3/00*     (2006.01)

(52) U.S. Cl.
    CPC .......... *G09G 3/2003* (2013.01); *H04N 13/324* (2018.05); *G09G 2300/0443* (2013.01); *G09G 2300/0452* (2013.01)

(56) References Cited

U.S. PATENT DOCUMENTS

| | | | | |
|---|---|---|---|---|
| 2008/0218459 A1* | 9/2008 | Kim | ...................... | G02F 1/1323 345/87 |
| 2011/0007390 A1* | 1/2011 | Yanamoto | .......... | G02B 27/2214 359/466 |
| 2011/0043715 A1* | 2/2011 | Ohyama | ............ | G02B 27/2214 349/15 |
| 2011/0234582 A1* | 9/2011 | Daiku | ................ | G02B 27/2214 345/419 |
| 2012/0050857 A1* | 3/2012 | Lee | ...................... | G02B 27/2214 359/464 |
| 2012/0182404 A1* | 7/2012 | Hsu | ...................... | H04N 13/0409 348/54 |
| 2013/0148045 A1* | 6/2013 | Ohyama | .................. | G09G 3/36 349/15 |
| 2013/0208195 A1* | 8/2013 | Cho | .................. | G02F 1/134309 349/15 |
| 2014/0240475 A1* | 8/2014 | Shigemura | ......... | H04N 13/0406 348/59 |
| 2014/0240827 A1* | 8/2014 | Asai | .................. | G02B 27/2214 359/463 |
| 2014/0300714 A1* | 10/2014 | Muller | .................. | H04N 13/31 348/54 |
| 2016/0148551 A1* | 5/2016 | Jian | ..................... | H04N 13/0022 345/419 |
| 2016/0370921 A1* | 12/2016 | Huang | ................. | G02B 27/225 |
| 2017/0307898 A1* | 10/2017 | Vdovin | ................ | G02B 27/2214 |

FOREIGN PATENT DOCUMENTS

| | | |
|---|---|---|
| CN | 204166206 U | 2/2015 |
| CN | 104656337 A | 5/2015 |
| TW | 201323926 A | 6/2013 |

* cited by examiner

| R | G | B |
|---|---|---|
| B | R | G |
| G | B | R |

FIG. 3

| R | G | B | R | G | B | R | G | B |
|---|---|---|---|---|---|---|---|---|
| B | R | G | B | R | G | B | R | G |
| G | B | R | G | B | R | G | B | R |
| R | G | B | R | G | B | R | G | B |
| B | R | G | B | R | G | B | R | G |
| G | B | R | G | B | R | G | B | R |

3D DISPLAY DEVICE AND DRIVING METHOD THEREOF

FIELD OF THE INVENTION

The present invention relates to the field of display technology, and in particular, relates to a 3D display device and a driving method thereof.

BACKGROUND OF THE INVENTION

The main principle of the 3D display technology lies in that the right eye and the left eye of a viewer receive different images, respectively, and the image received by the left eye and the image received by the right eye are analyzed and overlapped by the viewer's brain so that the viewer may sense hierarchy of the images, thus obtaining a stereoscopic sense.

Currently, 3D displays mainly include two kinds: one kind requires wearing 3D glasses, and the other kind is a naked-eye 3D display. Parallax barrier technology belongs to the naked-eye 3D technology. However, the existing 3D display based on the parallax barrier technology can be viewed only in the horizontal screen condition or in the vertical screen condition, which make the viewer see the 3D effect only in one condition.

SUMMARY OF THE INVENTION

In order to solve the above problem, the invention provides a 3D display device and a driving method thereof, to solve the problem in the prior art that the 3D display effect can be obtained only in the horizontal screen condition or in the vertical screen condition of the 3D display.

Thus, the present invention provides a 3D display device, including a display panel and a grating structure, wherein the grating structure is disposed at a light outgoing surface of the display panel, the grating structure is configured for forming light-transmission regions and light-blocking regions, the display panel includes a pixel array, the pixel array includes a plurality of pixel units, each of which includes a plurality of sub-pixels which are regularly arranged in a first direction and a second direction, and the first direction is perpendicular to the second direction, the pixel array is configured for forming a plurality of first left-eye pixel regions corresponding to the left eye and a plurality of first right-eye pixel regions corresponding to the right eye by the grating structure when both eyes are parallel to the first direction;

the pixel array is further configured for forming a plurality of second left-eye pixel regions corresponding to the left eye and a plurality of second right-eye pixel regions corresponding to the right eye by the grating structure when both eyes are parallel to the second direction;

the first left-eye pixel regions are the same as the second left-eye pixel regions, and the first right-eye pixel regions are the same as the second right-eye pixel regions; and each pixel unit is configured for forming the first left-eye pixel region and the first right-eye pixel region.

Optionally, the pixel unit includes nine sub-pixels, and the nine sub-pixels are arranged in a 3×3 rectangular array.

Optionally, the sub-pixels in the pixel unit include a red sub-pixel R, a green sub-pixel G, and a blue sub-pixel B, and the rectangular array includes any one of the following arrangements:

$$\begin{bmatrix} RGB \\ BRG \\ GBR \end{bmatrix}, \begin{bmatrix} RBG \\ GRB \\ BGR \end{bmatrix}, \begin{bmatrix} BRG \\ GBR \\ RGB \end{bmatrix}, \begin{bmatrix} BGR \\ RBG \\ GRB \end{bmatrix}, \begin{bmatrix} GRB \\ BGR \\ RBG \end{bmatrix} \text{ and } \begin{bmatrix} GBR \\ RGB \\ BRG \end{bmatrix}.$$

Optionally, a width-to-height ratio of each sub-pixel is 1:1.

Optionally, the first left-eye pixel region includes three sub-pixels, which are located at a diagonal line of the pixel unit, and the first right-eye pixel region includes the other six sub-pixels; or the first right-eye pixel region includes three sub-pixels, which are located at a diagonal line of the pixel unit, and the first left-eye pixel region includes the other six sub-pixels.

Optionally, two adjacent pixel units include a first adjacent pixel unit and a second adjacent pixel unit, the first left-eye pixel region of the first adjacent pixel unit includes five sub-pixels, which are located at a first and a second diagonal lines of the first adjacent pixel unit, and the first right-eye pixel region of the first adjacent pixel unit includes the other four sub-pixels; the first right-eye pixel region of the second adjacent pixel unit includes five sub-pixels, which are located at a first and a second diagonal lines of the second adjacent pixel unit, and the first left-eye pixel region of the second adjacent pixel unit includes the other four sub-pixels; and the first diagonal line is perpendicular to the second diagonal line; or the first right-eye pixel region of the first adjacent pixel unit includes five sub-pixels, which are located at a first and a second diagonal lines of the first adjacent pixel unit, and the first left-eye pixel region of the first adjacent pixel unit includes the other four sub-pixels; the first left-eye pixel region of the second adjacent pixel unit includes five sub-pixels, which are located at a first and a second diagonal lines of the second adjacent pixel unit, and the first right-eye pixel region of the second adjacent pixel unit includes the other four sub-pixels; and the first diagonal line is perpendicular to the second diagonal line.

Optionally, the pixel unit is provided with a buffering region, which includes three sub-pixels located at a diagonal line of the pixel unit and having a gray value of 0, the first left-eye pixel region includes three sub-pixels, which are located at a side of the diagonal line, and the first right-eye pixel region includes the other three sub-pixels.

Optionally, the plurality of sub-pixels of each pixel unit include a first color sub-pixel, a second color sub-pixel and a third color sub-pixel, two adjacent pixel units include a first adjacent pixel unit and a second adjacent pixel unit, the first color sub-pixel, the second color sub-pixel and the third color sub-pixel located at a side of a diagonal line within the first adjacent pixel unit form a triangular virtual pixel, and the first color sub-pixel and the second color sub-pixel at a side of a diagonal line within the second adjacent pixel unit and the third color sub-pixel of the first adjacent pixel unit form another triangular virtual pixel.

Further optionally, the plurality of sub-pixels of each pixel unit include a red sub-pixel R, a green sub-pixel G, and a blue sub-pixel B, two adjacent pixel units include a first adjacent pixel unit and a second adjacent pixel unit, the red sub-pixel R, the green sub-pixel G and the blue sub-pixel B located at a side of a diagonal line within the first adjacent pixel unit form a triangular virtual pixel, and two colors of sub-pixels of the red sub-pixel R, the green sub-pixel G and the blue sub-pixel B at a side of a diagonal line within the second adjacent pixel unit and the third color of sub-pixel of the red sub-pixel R, the green sub-pixel G and the blue sub-pixel B of the first adjacent pixel unit form another triangular virtual pixel.

Optionally, the grating structure includes a first substrate, a second substrate and a liquid crystal layer interposed between the first substrate and the second substrate, and the liquid crystal layer is made of a liquid crystal material.

Optionally, the grating structure includes a first substrate, a second substrate and an electrochromic layer interposed between the first substrate and the second substrate, and the electrochromic layer is made of an electrochromic material.

The invention further provides a driving method of the above 3D display device, including steps of:

forming the light-transmission regions and the light-blocking regions by the grating structure; and causing the pixel array to form the plurality of first left-eye pixel regions corresponding to the left eye and the plurality of first right-eye pixel regions corresponding to the right eye by the grating structure when both eyes are parallel to the first direction; causing the pixel array to form the plurality of second left-eye pixel regions corresponding to the left eye and the plurality of second right-eye pixel regions corresponding to the right eye by the grating structure when both eyes are parallel to the second direction, wherein the first left-eye pixel regions are the same as the second left-eye pixel regions, and the first right-eye pixel regions are the same as the second right-eye pixel regions; and each pixel unit is configured for forming the first left-eye pixel region and the first right-eye pixel region.

The invention has the following advantageous effects:

In the 3D display device and the driving method thereof provided by the invention, the 3D display device includes the display panel and the grating structure, when both eyes are parallel to the first direction, the pixel array of the display panel forms the plurality of first left-eye pixel regions corresponding to the left eye and the plurality of first right-eye pixel regions corresponding to the right eye by the grating structure; when both eyes are parallel to the second direction, the pixel array of the display panel forms the plurality of second left-eye pixel regions corresponding to the left eye and the plurality of second right-eye pixel regions corresponding to the right eye by the grating structure, the first left-eye pixel regions are the same as the second left-eye pixel regions, and the first right-eye pixel regions are the same as the second right-eye pixel regions. The technical solutions provided by the invention can obtain the 3D display effect in both the horizontal screen condition and the vertical screen condition.

BRIEF DESCRIPTION OF THE DRAWINGS

FIG. 3 is a schematic view of a structure of a pixel unit in the first embodiment;

FIG. 4 is a schematic view of a structure of a pixel array in the first embodiment;

FIG. 7 is a schematic view illustrating a first arrangement of second left-eye pixel regions and second right-eye pixel regions of the pixel array shown in FIG. 4 when both eyes are parallel to a second direction, this first arrangement corresponding to the first arrangement of the first left-eye pixel regions and the first right-eye pixel regions shown in FIG. 5;

FIG. 8 is a schematic view illustrating a third arrangement of the first left-eye pixel regions and the first right-eye pixel regions of the pixel array shown in FIG. 4 when both eyes are parallel to the first direction;

DETAILED DESCRIPTION OF THE EMBODIMENTS

In order to make a person skilled in the art better understand technical solutions of the invention, a 3D display device and a driving method thereof provided by the invention will be described in detail below in conjunction with the drawings.

First Embodiment

Figure 1:
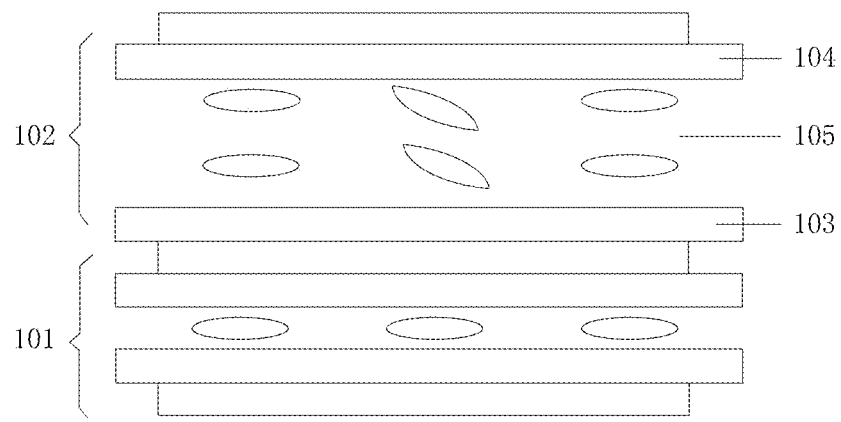
FIG. 1 is a schematic view of a structure of a 3D display device provided by a first embodiment of the invention.

FIG. 1 is a schematic view of a structure of a 3D display device provided by the first embodiment of the invention. As shown in FIG. 1, the 3D display device includes a display panel 101 and a grating structure 102, the grating structure 102 is disposed at a light outgoing surface of the display panel 101, the grating structure 102 is configured for forming light-transmission regions and light-blocking regions, the display panel 101 includes a pixel array, the pixel array includes a plurality of pixel units, each of which includes a plurality of sub-pixels which are regularly arranged in a first direction and a second direction, and the first direction is perpendicular to the second direction. Optionally, the first direction is a horizontal direction, and the second direction is a vertical direction.

In the embodiment, the light-transmission regions and the light-blocking regions are formed by rotation of liquid crystal molecules, and in this case, referring to FIG. 1, the grating structure 102 includes a first substrate 103, a second substrate 104 and a liquid crystal layer 105 interposed between the first substrate 103 and the second substrate 104, and the liquid crystal layer 105 is made of a liquid crystal material. Optionally, the grating structure may include a first substrate, a second substrate and an electrochromic layer interposed between the first substrate and the second substrate, and the electrochromic layer is made of an electrochromic material.

Figure 2:
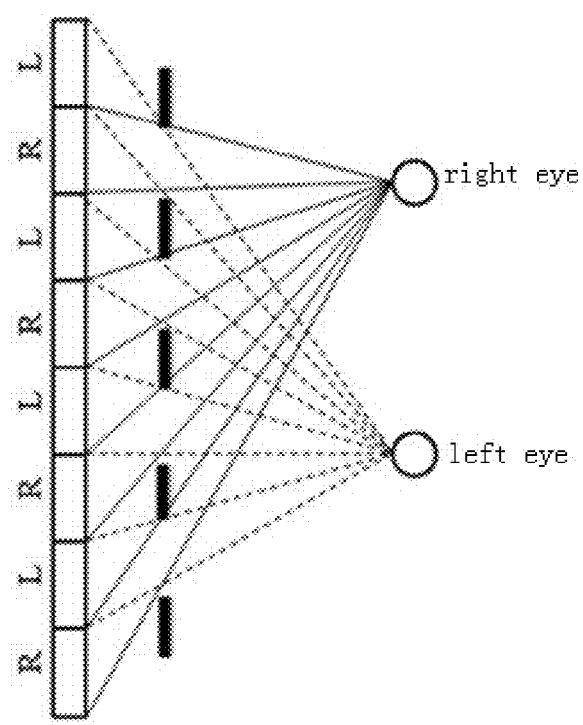
FIG. 2 is a light path diagram of the 3D display device in FIG. 1.

FIG. 2 is a light path diagram of the 3D display device in FIG. 1. Referring to FIG. 2, by controlling a voltage difference between the first substrate and the second substrate, the liquid crystal molecules in the liquid crystal layer are rotated to generate opaque stripes and thus form the light-transmission regions and the light-blocking regions. Under the effect of the light-transmission regions and the light-blocking regions, the left eye can only see a left-eye image and the right eye can only see a right-eye image, and thus a 3D image is formed finally.

In the embodiment, when both eyes are parallel to the first direction, the pixel array forms a plurality of first left-eye pixel regions corresponding to the left eye and a plurality of first right-eye pixel regions corresponding to the right eye by the grating structure 102. When both eyes are parallel to the second direction, the pixel array forms a plurality of second left-eye pixel regions corresponding to the left eye and a plurality of second right-eye pixel regions corresponding to the right eye by the grating structure 102. The first left-eye pixel regions are the same as the second left-eye pixel regions, and the first right-eye pixel regions are the same as the second right-eye pixel regions, so that the 3D display effect can be obtained in both the horizontal screen condition (corresponding to a state when both eyes are parallel to the first direction) and the vertical screen condition (corresponding to a state when both eyes are parallel to the second direction). In addition, each pixel unit is configured for forming the first left-eye pixel region and the first right-eye pixel region, and since the plurality of first left-eye pixel regions are the same as the plurality of second left-eye pixel regions, and the plurality of first right-eye pixel regions are the same as the plurality of second right-eye pixel regions, and thus each pixel unit also includes the second left-eye pixel region and the second right-eye pixel region.

FIG. 3 is a schematic view of a structure of a pixel unit in the first embodiment. As shown in FIG. 3, the pixel unit includes nine sub-pixels, and the nine sub-pixels are arranged in a 3×3 rectangular array. FIG. 4 is a schematic view of a structure of a pixel array in the first embodiment. As shown in FIG. 4, the pixel array is formed by a regular arrangement of the pixel units shown in FIG. 3. In the embodiment, a width-to-height ratio of each sub-pixel is 1:1, the plurality of sub-pixels of each pixel unit include a red sub-pixel R, a green sub-pixel G and a blue sub-pixel B, and the pixel unit is arranged in the following rectangular array:

$$\begin{bmatrix} RGB \\ BRG \\ GBR \end{bmatrix}.$$

In a practical application, the rectangular array may include any one of the following arrangements:

$$\begin{bmatrix} RGB \\ BRG \\ GBR \end{bmatrix}, \begin{bmatrix} RBG \\ GRB \\ BGR \end{bmatrix}, \begin{bmatrix} BRG \\ GBR \\ RGB \end{bmatrix}, \begin{bmatrix} BGR \\ RBG \\ GRB \end{bmatrix}, \begin{bmatrix} GRB \\ BGR \\ RBG \end{bmatrix} \text{ and } \begin{bmatrix} GBR \\ RGB \\ BRG \end{bmatrix}.$$

Figure 5:
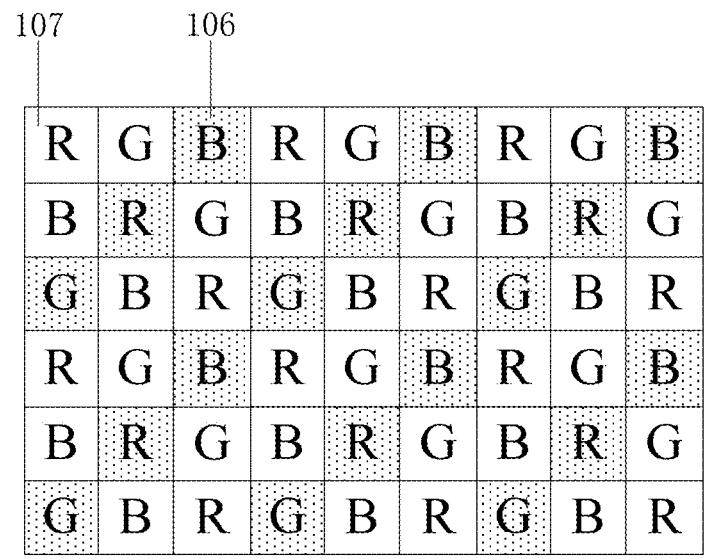
FIG. 5 is a schematic view illustrating a first arrangement of first left-eye pixel regions and first right-eye pixel regions of the pixel array shown in FIG. 4 when both eyes are parallel to a first direction.

FIG. 5 is a schematic view illustrating a first arrangement of first left-eye pixel regions and first right-eye pixel regions of the pixel array shown in FIG. 4 when both eyes are parallel to the first direction. As shown in FIG. 5, the first left-eye pixel region 106 of each pixel unit includes three sub-pixels, which are located at a diagonal line of the pixel unit, and the first right-eye pixel region 107 of the pixel unit includes the other six sub-pixels. When both eyes are parallel to the first direction, under the effect of the light-transmission regions and the light-blocking regions, the left eye can only see the image displayed by the first left-eye pixel regions 106, and the right eye can only see the image displayed by the first right-eye pixel regions 107, thus forming a left-eye image and a right-eye image, respectively, and finally forming a 3D image.

Figure 6:
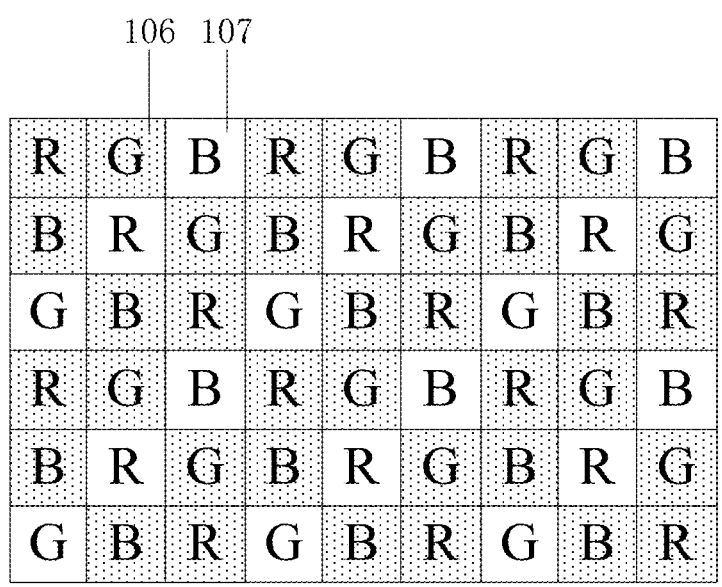
FIG. 6 is a schematic view illustrating a second arrangement of the first left-eye pixel regions and the first right-eye pixel regions of the pixel array shown in FIG. 4 when both eyes are parallel to the first direction.

FIG. 6 is a schematic view illustrating a second arrangement of the first left-eye pixel regions and the first right-eye pixel regions of the pixel array shown in FIG. 4 when both eyes are parallel to the first direction. As shown in FIG. 6, the first right-eye pixel region 107 of each pixel unit includes three sub-pixels, which are located at a diagonal line of the pixel unit, and the first left-eye pixel region 106 of the pixel unit includes the other six sub-pixels. When both eyes are parallel to the first direction, under the effect of the light-transmission regions and the light-blocking regions, the right eye can only see the image displayed by the first right-eye pixel regions 107, and the left eye can only see the image displayed by the first left-eye pixel regions 106, thus forming a left-eye image and a right-eye image, respectively, and finally forming a 3D image.

Figures 7, 8:
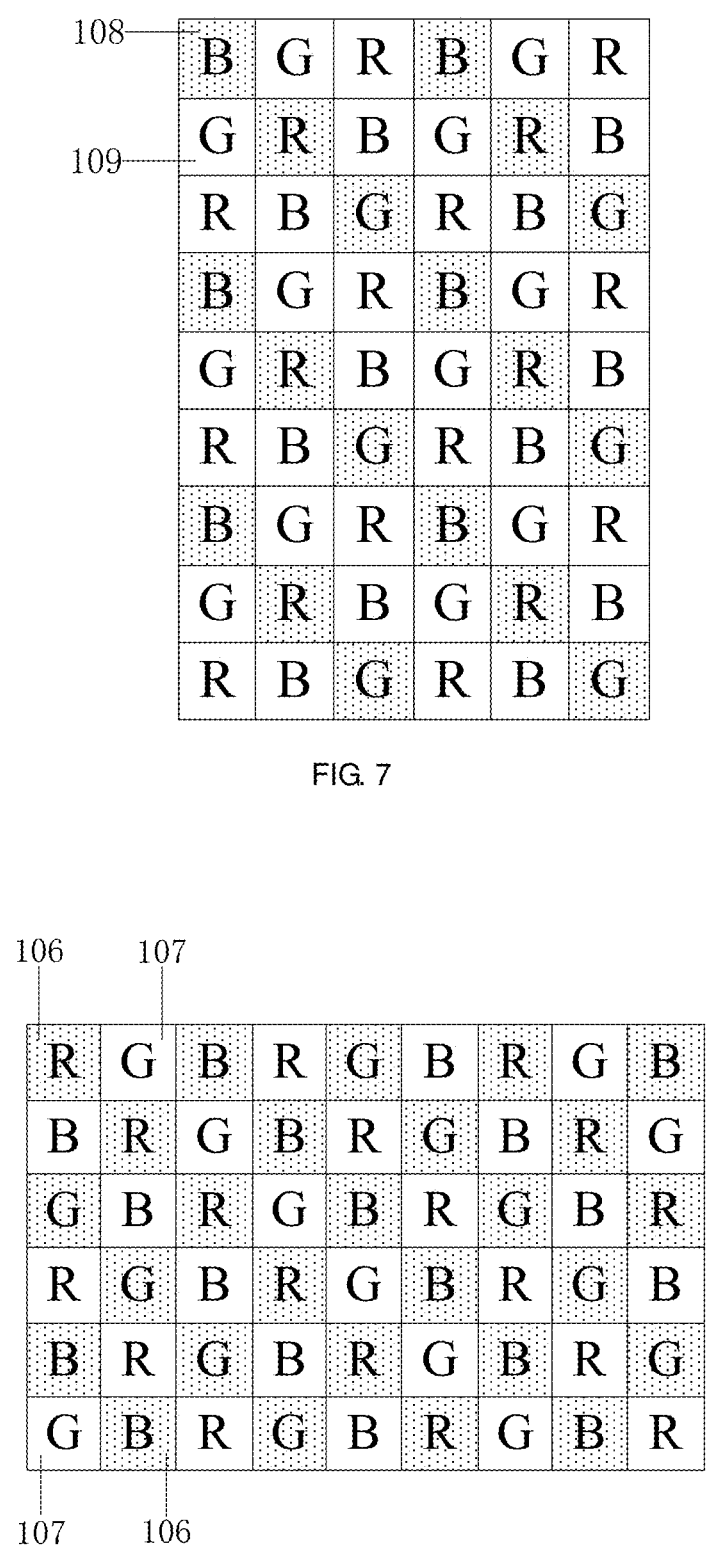

FIG. 7 is a schematic view illustrating a first arrangement of second left-eye pixel regions and second right-eye pixel regions of the pixel array shown in FIG. 4 when both eyes are parallel to the second direction, this first arrangement corresponding to the first arrangement of the first left-eye pixel regions and the first right-eye pixel regions shown in FIG. 5. As shown in FIG. 7, when both eyes are parallel to the second direction, under the effect of the light-transmission regions and the light-blocking regions, the left eye can only see the image displayed by the second left-eye pixel regions 108, and the right eye can only see the image displayed by the second right-eye pixel regions 109, thus forming a left-eye image and a right-eye image, respectively, and finally forming a 3D image. At this time, the first left-eye pixel regions 106 are the same as the second left-eye pixel regions 108, and the first right-eye pixel regions 107 are the same as the second right-eye pixel regions 109. Thus, the display device provided by this embodiment can obtain the 3D display effect in both the horizontal screen condition and the vertical screen condition.

FIG. 8 is a schematic view illustrating a third arrangement of the first left-eye pixel regions and the first right-eye pixel regions of the pixel array shown in FIG. 4 when both eyes are parallel to the first direction. As shown in FIG. 8, two adjacent pixel units include a first adjacent pixel unit and a second adjacent pixel unit, the first left-eye pixel region 106 of the first adjacent pixel unit includes five sub-pixels, which are located at a first and second diagonal lines of the first adjacent pixel unit, the first right-eye pixel region 107 of the first adjacent pixel unit includes the other four sub-pixels, the first right-eye pixel region 107 of the second adjacent pixel unit includes five sub-pixels, which are located at a first and second diagonal lines of the second adjacent pixel unit, the first left-eye pixel region 106 of the second adjacent pixel unit includes the other four sub-pixels, and the first diagonal line is perpendicular to the second diagonal line. When both eyes are parallel to the first direction, under the effect of the light-transmission regions and the light-blocking regions, the left eye can only see the image displayed by the first left-eye pixel regions, and the right eye can only see the image displayed by the first right-eye pixel regions, thus forming a left-eye image and a right-eye image, respectively, and finally forming a 3D image.

Optionally, the first right-eye pixel region of the first adjacent pixel unit includes five sub-pixels, which are located at the first and second diagonal lines of the first adjacent pixel unit, the first left-eye pixel region of the first adjacent pixel unit includes the other four sub-pixels, the first left-eye pixel region of the second adjacent pixel unit includes five sub-pixels, which are located at the first and second diagonal lines of the second adjacent pixel unit, the first right-eye pixel region of the second adjacent pixel unit includes the other four sub-pixels, and the first diagonal line is perpendicular to the second diagonal line. When both eyes are parallel to the first direction, under the effect of the light-transmission regions and the light-blocking regions, the right eye can only see the image displayed by the first right-eye pixel regions, and the left eye can only see the image displayed by the first left-eye pixel regions, thus forming a right-eye image and a left-eye image, respectively, and finally forming a 3D image.

In the embodiment, when both eyes are parallel to the second direction, under the effect of the light-transmission regions and the light-blocking regions, the left eye can only see the image displayed by the second left-eye pixel regions, and the right eye can only see the image displayed by the second right-eye pixel regions, thus forming a left-eye image and a right-eye image, respectively, and finally forming a 3D image. At this time, the first left-eye pixel regions are the same as the second left-eye pixel regions, and the first right-eye pixel regions are the same as the second right-eye pixel regions. Thus, the display device provided by this embodiment can obtain the 3D display effect in both the horizontal screen condition and the vertical screen condition.

Figure 9:
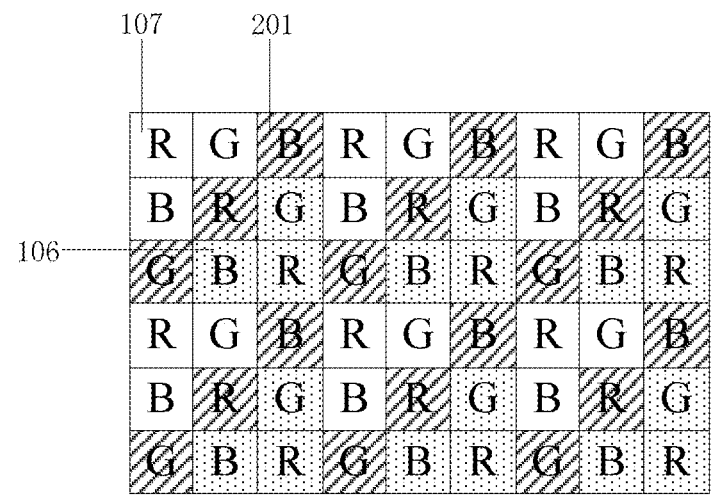
FIG. 9 is a schematic view illustrating a fourth arrangement of the first left-eye pixel regions and the first right-eye pixel regions of the pixel array shown in FIG. 4 when both eyes are parallel to the first direction.

FIG. 9 is a schematic view illustrating a fourth arrangement of the first left-eye pixel regions and the first right-eye pixel regions of the pixel array shown in FIG. 4 when both eyes are parallel to the first direction. As shown in FIG. 9, each pixel unit are provided with a buffering region 201, which includes three sub-pixels located at a diagonal line of the pixel unit and having a gray value of 0, the first left-eye pixel region 106 of the pixel unit includes three sub-pixels, which are located at a side of the diagonal line, and the first right-eye pixel region 107 of the pixel unit includes the other three sub-pixels. The buffering region 201 may effectively isolate the group of sub-pixels for displaying the left-eye image and the group of sub-pixels for displaying the right-eye image, thus reducing crosstalk phenomenon in the 3D display.

In particular, the sub-pixels of the buffering region 201 is made of the material of a black matrix.

Figure 10:
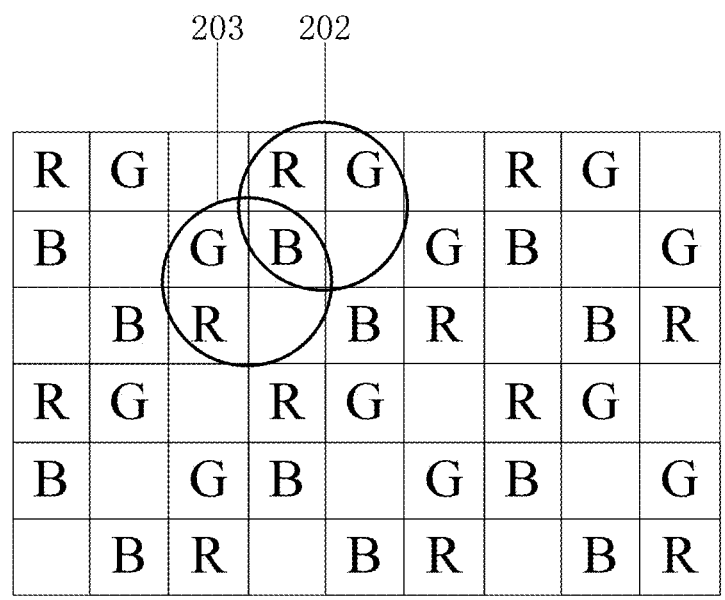
FIG. 10 is a schematic view of a structure of the pixel array shown in FIG. 4 when both eyes are parallel to the first direction.
Figure 11:
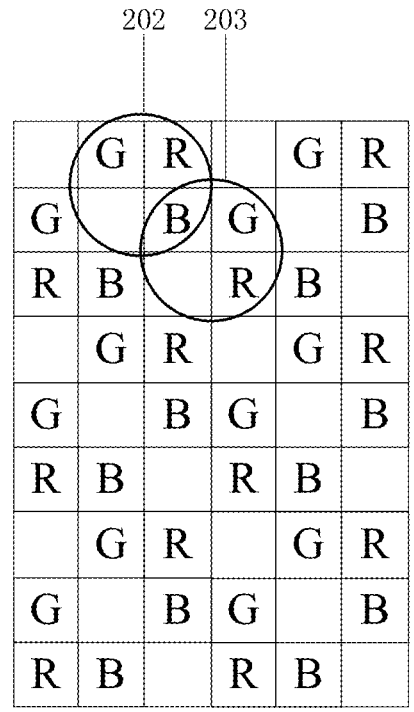
FIG. 11 is a schematic view of a structure of the pixel array shown in FIG. 4 when both eyes are parallel to the second direction, this structure corresponding to the structure of the pixel array shown in FIG. 10.

FIG. 10 is a schematic view of a structure of the pixel array shown in FIG. 4 when both eyes are parallel to the first direction, and FIG. 11 is a schematic view of a structure of the pixel array shown in FIG. 4 when both eyes are parallel to the second direction, the structure of the pixel array shown in FIG. 11 corresponding to the structure of the pixel array shown in FIG. 10. As shown in FIGS. 10 and 11, the plurality of sub-pixels of each pixel unit include a red sub-pixel R, a green sub-pixel G, and a blue sub-pixel B, and two adjacent pixel units include a first adjacent pixel unit and a second adjacent pixel unit. The red sub-pixel R, the green sub-pixel G and the blue sub-pixel B located at a side of a diagonal line within the first adjacent pixel unit form a triangular virtual pixel 202. The red sub-pixel R and the green sub-pixel G at a side of a diagonal line within the second adjacent pixel unit and the blue sub-pixel B of the first adjacent pixel unit form another triangular virtual pixel 203. That is, the red sub-pixel R and the green sub-pixel G in the virtual pixel 203 may achieve the display function with the help of the blue sub-pixel B in the virtual pixel 202, thus obtaining an actual visual resolution larger than a physical resolution, and increasing the quality of the displayed image.

The 3D display device provided by the embodiment includes the display panel and the grating structure, when both eyes are parallel to the first direction, the pixel array of the display panel forms the plurality of first left-eye pixel regions corresponding to the left eye and the plurality of first right-eye pixel regions corresponding to the right eye by the grating structure; when both eyes are parallel to the second direction, the pixel array of the display panel forms the plurality of second left-eye pixel regions corresponding to the left eye and the plurality of second right-eye pixel regions corresponding to the right eye by the grating structure, the first left-eye pixel regions are the same as the second left-eye pixel regions, and the first right-eye pixel regions are the same as the second right-eye pixel regions. The technical solutions provided by the embodiment can obtain the 3D display effect in both the horizontal screen condition and the vertical screen condition.

Second Embodiment

Figure 12:
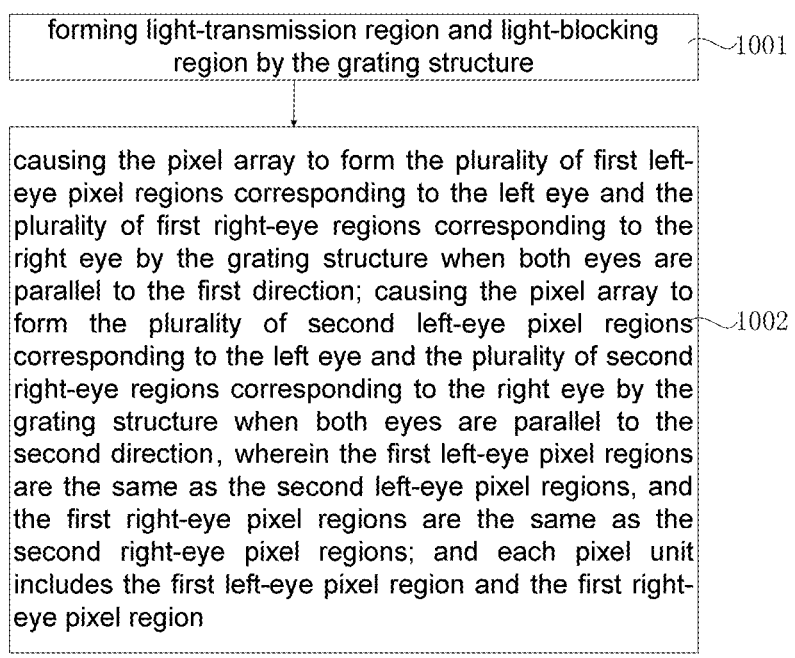
FIG. 12 is a flowchart illustrating a driving method of a 3D display device provided by a second embodiment of the invention.

FIG. 12 is a flowchart illustrating a driving method of a 3D display device provided by a second embodiment of the invention. As shown in FIG. 12, the 3D display device includes a display panel and a grating structure, the grating structure is disposed at a light outgoing surface of the display panel, the display panel includes a pixel array, the pixel array includes a plurality of pixel units, each of which includes a plurality of sub-pixels which are regularly arranged in a first direction and a second direction, and the first direction is perpendicular to the second direction.

The driving method includes:

Step 1001: forming light-transmission regions and light-blocking regions by the grating structure; and Step 1002: causing the pixel array to form the plurality of first left-eye pixel regions corresponding to the left eye and the plurality of first right-eye pixel regions corresponding to the right eye by the grating structure when both eyes are parallel to the first direction; causing the pixel array to form the plurality of second left-eye pixel regions corresponding to the left eye and the plurality of second right-eye pixel regions corresponding to the right eye by the grating structure when both eyes are parallel to the second direction, wherein the first left-eye pixel regions are the same as the second left-eye pixel regions, and the first right-eye pixel regions are the same as the second right-eye pixel regions; and each pixel unit is configured for forming the first left-eye pixel region and the first right-eye pixel region.

In this embodiment, by controlling a voltage difference between the first substrate and the second substrate in the grating structure, the liquid crystal molecules in the liquid crystal layer are rotated to generate opaque stripes and thus form the light-transmission regions and the light-blocking regions. Under the effect of the light-transmission regions and the light-blocking regions, the left eye can only see the left-eye image and the right eye can only see the right-eye image, thus forming a left-eye image and a right-eye image, respectively, and finally forming a 3D image.

In particular, when both eyes are parallel to the first direction, under the effect of the light-transmission regions and the light-blocking regions, the left eye can only see the image displayed by the first left-eye pixel regions, and the right eye can only see the image displayed by the first right-eye pixel regions, thus forming a left-eye image and a right-eye image, respectively, and finally forming a 3D image. When both eyes are parallel to the second direction, under the effect of the light-transmission regions and the light-blocking regions, the left eye can only see the image displayed by the second left-eye pixel regions, and the right eye can only see the image displayed by the second right-eye pixel regions, thus forming a left-eye image and a right-eye image, respectively, and finally forming a 3D image. At this time, the first left-eye pixel regions are the same as the second left-eye pixel regions, and the first right-eye pixel regions are the same as the second right-eye pixel regions. Thus, the driving method of the 3D display device provided by this embodiment can obtain the 3D display effect in both the horizontal screen condition and the vertical screen condition.

In the driving method of the 3D display device provided by the embodiment, the driving method specifically includes forming light-transmission regions and light-blocking regions by the grating structure; causing the pixel array to form the plurality of first left-eye pixel regions corresponding to the left eye and the plurality of first right-eye pixel regions corresponding to the right eye by the grating structure when both eyes are parallel to the first direction; and causing the pixel array to form the plurality of second left-eye pixel regions corresponding to the left eye and the plurality of second right-eye pixel regions corresponding to the right eye by the grating structure when both eyes are parallel to the second direction, wherein the first left-eye pixel regions are the same as the second left-eye pixel regions, and the first right-eye pixel regions are the same as the second right-eye pixel regions. The technical solution provided by the embodiment can obtain the 3D display effect in both the horizontal screen condition and the vertical screen condition.

It should be understood that, the foregoing embodiments are only exemplary embodiments used for explaining the principle of the present invention, but the present invention is not limited thereto. Various variations and improvements may be made by a person skilled in the art without departing from the protection scope of the present invention, and these variations and improvements also fall into the protection scope of the present invention.

What is claimed is:

1. A 3D display device, including a display panel and a grating structure, wherein the grating structure is disposed at a light outgoing surface of the display panel, the grating structure is configured for forming light-transmission regions and light-blocking regions, the display panel includes a pixel array, the pixel array includes a plurality of pixel units, each of which includes a plurality of sub-pixels which are regularly arranged in a first direction and a second direction, and the first direction is perpendicular to the second direction, the pixel array is configured for forming a plurality of first left-eye pixel regions corresponding to a left eye and a plurality of first right-eye pixel regions corresponding to a right eye by the grating structure when both eyes are parallel to the first direction;
the pixel array is further configured for forming a plurality of second left-eye pixel regions corresponding to the left eye and a plurality of second right-eye pixel regions corresponding to the right eye by the grating structure when both eyes are parallel to the second direction;
the first left-eye pixel regions are the same as the second left-eye pixel regions, and the first right-eye pixel regions are the same as the second right-eye pixel regions; and each pixel unit is configured for forming the first left-eye pixel region and the first right-eye pixel region,
wherein the grating structure includes a first substrate, a second substrate and a liquid crystal layer or an electrochromic layer interposed between the first substrate and the second substrate, the liquid crystal layer is made of a liquid crystal material and the electrochromic layer is made of an electrochromic material,
wherein the pixel unit includes nine sub-pixels, and the nine sub-pixels are arranged in a 3×3 rectangular array; and
wherein the sub-pixels in the pixel unit include a red sub-pixel R, a green sub-pixel G, and a blue sub-pixel B, and the rectangular array includes any one of the following arrangements:

$$\begin{bmatrix} RGB \\ BRG \\ GBR \end{bmatrix}, \begin{bmatrix} RBG \\ GRB \\ BGR \end{bmatrix}, \begin{bmatrix} BRG \\ GBR \\ RGB \end{bmatrix}, \begin{bmatrix} BGR \\ RBG \\ GRB \end{bmatrix}, \begin{bmatrix} GRB \\ BGR \\ RBG \end{bmatrix} \text{ and } \begin{bmatrix} GBR \\ RGB \\ BRG \end{bmatrix}.$$

2. The 3D display device of claim 1, wherein a width-to-height ratio of each sub-pixel is 1:1.

3. The 3D display device of claim 1, wherein the first left-eye pixel region includes three sub-pixels, which are located at a diagonal line of the pixel unit, and the first right-eye pixel region includes the other six sub-pixels; or
the first right-eye pixel region includes three sub-pixels, which are located at a diagonal line of the pixel unit, and the first left-eye pixel region includes the other six sub-pixels.

4. The 3D display device of claim 2, wherein the first left-eye pixel region includes three sub-pixels, which are located at a diagonal line of the pixel unit, and the first right-eye pixel region includes the other six sub-pixels; or
the first right-eye pixel region includes three sub-pixels, which are located at a diagonal line of the pixel unit, and the first left-eye pixel region includes the other six sub-pixels.

5. The 3D display device of claim 1, wherein two adjacent pixel units include a first adjacent pixel unit and a second adjacent pixel unit, the first left-eye pixel region of the first adjacent pixel unit includes five sub-pixels, which are located at a first and a second diagonal lines of the first adjacent pixel unit, and the first right-eye pixel region of the first adjacent pixel unit includes the other four sub-pixels; the first right-eye pixel region of the second adjacent pixel unit includes five sub-pixels, which are located at a first and a second diagonal lines of the second adjacent pixel unit, and the first left-eye pixel region of the second adjacent pixel unit includes the other four sub-pixels; and the first diagonal line is perpendicular to the second diagonal line; or
the first right-eye pixel region of the first adjacent pixel unit includes five sub-pixels, which are located at a first and a second diagonal lines of the first adjacent pixel unit, and the first left-eye pixel region of the first adjacent pixel unit includes the other four sub-pixels; the first left-eye pixel region of the second adjacent pixel unit includes five sub-pixels, which are located at a first and a second diagonal lines of the second adjacent pixel unit, and the first right-eye pixel region of the second adjacent pixel unit includes the other four sub-pixels; and the first diagonal line is perpendicular to the second diagonal line.

6. The 3D display device of claim 2, wherein two adjacent pixel units include a first adjacent pixel unit and a second adjacent pixel unit, the first left-eye pixel region of the first adjacent pixel unit includes five sub-pixels, which are located at a first and a second diagonal lines of the first adjacent pixel unit, and the first right-eye pixel region of the first adjacent pixel unit includes the other four sub-pixels; the first right-eye pixel region of the second adjacent pixel unit includes five sub-pixels, which are located at a first and a second diagonal lines of the second adjacent pixel unit, and the first left-eye pixel region of the second adjacent pixel unit includes the other four sub-pixels; and the first diagonal line is perpendicular to the second diagonal line; or the first right-eye pixel region of the first adjacent pixel unit includes five sub-pixels, which are located at a first and a second diagonal lines of the first adjacent pixel unit, and the first left-eye pixel region of the first adjacent pixel unit includes the other four sub-pixels; the first left-eye pixel region of the second adjacent pixel unit includes five sub-pixels, which are located at a first and a second diagonal lines of the second adjacent pixel unit, and the first right-eye pixel region of the second adjacent pixel unit includes the other four sub-pixels; and the first diagonal line is perpendicular to the second diagonal line.

7. The 3D display device of claim 1, wherein the pixel unit is provided with a buffering region, which includes three sub-pixels located at a diagonal line of the pixel unit and having a gray value of 0, the first left-eye pixel region includes three sub-pixels, which are located at a side of the diagonal line, and the first right-eye pixel region includes the other three sub-pixels.

8. The 3D display device of claim 2, wherein the pixel unit is provided with a buffering region, which includes three sub-pixels located at a diagonal line of the pixel unit and having a gray value of 0, the first left-eye pixel region includes three sub-pixels, which are located at a side of the diagonal line, and the first right-eye pixel region includes the other three sub-pixels.

9. The 3D display device of claim 1, wherein two adjacent pixel units include a first adjacent pixel unit and a second adjacent pixel unit, the red sub-pixel R, the green sub-pixel G and the blue sub-pixel B located at a side of a diagonal line within the first adjacent pixel unit form a triangular virtual pixel, and two colors of sub-pixels of the red sub-pixel R, the green sub-pixel G and the blue sub-pixel B at a side of a diagonal line within the second adjacent pixel unit and the third color of sub-pixel of the red sub-pixel R, the green sub-pixel G and the blue sub-pixel B of the first adjacent pixel unit form another triangular virtual pixel.

10. The 3D display device of claim 2, wherein two adjacent pixel units include a first adjacent pixel unit and a second adjacent pixel unit, the red sub-pixel R, the green sub-pixel G and the blue sub-pixel B located at a side of a diagonal line within the first adjacent pixel unit form a triangular virtual pixel, and two colors of sub-pixels of the red sub-pixel R, the green sub-pixel G and the blue sub-pixel B at a side of a diagonal line within the second adjacent pixel unit and the third color of sub-pixel of the red sub-pixel R, the green sub-pixel G and the blue sub-pixel B of the first adjacent pixel unit form another triangular virtual pixel.

11. A driving method of the 3D display device of claim 1, including steps of:

forming the light-transmission regions and the light-blocking regions by the grating structure; and causing the pixel array to form the plurality of first left-eye pixel regions corresponding to the left eye and the plurality of first right-eye pixel regions corresponding to the right eye by the grating structure when both eyes are parallel to the first direction; causing the pixel array to form the plurality of second left-eye pixel regions corresponding to the left eye and the plurality of second right-eye pixel regions corresponding to the right eye by the grating structure when both eyes are parallel to the second direction, wherein the first left-eye pixel regions are the same as the second left-eye pixel regions, and the first right-eye pixel regions are the same as the second right-eye pixel regions; and each pixel unit is configured for forming the first left-eye pixel region and the first right-eye pixel region.

12. The driving method of claim 11, wherein a width-to-height ratio of each sub-pixel is 1:1.

13. The driving method of claim 11, wherein the first left-eye pixel region includes three sub-pixels, which are located at a diagonal line of the pixel unit, and the first right-eye pixel region includes the other six sub-pixels; or the first right-eye pixel region includes three sub-pixels, which are located at a diagonal line of the pixel unit, and the first left-eye pixel region includes the other six sub-pixels.

14. The driving method of claim 12, wherein the first left-eye pixel region includes three sub-pixels, which are located at a diagonal line of the pixel unit, and the first right-eye pixel region includes the other six sub-pixels; or the first right-eye pixel region includes three sub-pixels, which are located at a diagonal line of the pixel unit, and the first left-eye pixel region includes the other six sub-pixels.

15. The driving method of claim 11, wherein two adjacent pixel units include a first adjacent pixel unit and a second adjacent pixel unit, the first left-eye pixel region of the first adjacent pixel unit includes five sub-pixels, which are located at a first and a second diagonal lines of the first adjacent pixel unit, and the first right-eye pixel region of the first adjacent pixel unit includes the other four sub-pixels; the first right-eye pixel region of the second adjacent pixel unit includes five sub-pixels, which are located at a first and a second diagonal lines of the second adjacent pixel unit, and the first left-eye pixel region of the second adjacent pixel unit includes the other four sub-pixels; and the first diagonal line is perpendicular to the second diagonal line; or the first right-eye pixel region of the first adjacent pixel unit includes five sub-pixels, which are located at a first and a second diagonal lines of the first adjacent pixel unit, and the first left-eye pixel region of the first adjacent pixel unit includes the other four sub-pixels; the first left-eye pixel region of the second adjacent pixel unit includes five sub-pixels, which are located at a first and a second diagonal lines of the second adjacent pixel unit, and the first right-eye pixel region of the second adjacent pixel unit includes the other four sub-pixels; and the first diagonal line is perpendicular to the second diagonal line.

16. The driving method of claim 12, wherein two adjacent pixel units include a first adjacent pixel unit and a second adjacent pixel unit, the first left-eye pixel region of the first adjacent pixel unit includes five sub-pixels, which are located at a first and a second diagonal lines of the first adjacent pixel unit, and the first right-eye pixel region of the first adjacent pixel unit includes the other four sub-pixels; the first right-eye pixel region of the second adjacent pixel unit includes five sub-pixels, which are located at a first and a second diagonal lines of the second adjacent pixel unit, and the first left-eye pixel region of the second adjacent pixel unit includes the other four sub-pixels; and the first diagonal line is perpendicular to the second diagonal line; or the first right-eye pixel region of the first adjacent pixel unit includes five sub-pixels, which are located at a first and a second diagonal lines of the first adjacent pixel unit, and the first left-eye pixel region of the first adjacent pixel unit includes the other four sub-pixels; the first left-eye pixel region of the second adjacent pixel unit includes five sub-pixels, which are located at a first and a second diagonal lines of the second adjacent pixel unit, and the first right-eye pixel region of the second adjacent pixel unit includes the other four sub-pixels; and the first diagonal line is perpendicular to the second diagonal line.

17. The driving method of claim 11, wherein the pixel unit is provided with a buffering region, which includes three sub-pixels located at a diagonal line of the pixel unit and having a gray value of 0, the first left-eye pixel region includes three sub-pixels, which are located at a side of the diagonal line, and the first right-eye pixel region includes the other three sub-pixels.

18. The driving method of claim 12, wherein the pixel unit is provided with a buffering region, which includes three sub-pixels located at a diagonal line of the pixel unit and having a gray value of 0, the first left-eye pixel region includes three sub-pixels, which are located at a side of the diagonal line, and the first right-eye pixel region includes the other three sub-pixels.

19. The driving method of claim 11, wherein two adjacent pixel units include a first adjacent pixel unit and a second adjacent pixel unit, the red sub-pixel R, the green sub-pixel G and the blue sub-pixel B located at a side of a diagonal line within the first adjacent pixel unit form a triangular virtual pixel, and two colors of sub-pixels of the red sub-pixel R, the green sub-pixel G and the blue sub-pixel B at a side of a diagonal line within the second adjacent pixel unit and the third color of sub-pixel of the red sub-pixel R, the green sub-pixel G and the blue sub-pixel B of the first adjacent pixel unit form another triangular virtual pixel.

20. The driving method of claim 12, wherein two adjacent pixel units include a first adjacent pixel unit and a second adjacent pixel unit, the red sub-pixel R, the green sub-pixel G and the blue sub-pixel B located at a side of a diagonal line within the first adjacent pixel unit form a triangular virtual pixel, and two colors of sub-pixels of the red sub-pixel R, the green sub-pixel G and the blue sub-pixel B at a side of a diagonal line within the second adjacent pixel unit and the third color of sub-pixel of the red sub-pixel R, the green sub-pixel G and the blue sub-pixel B of the first adjacent pixel unit form another triangular virtual pixel.

* * * * *